This invention relates generally to a machine tool and more particularly to a machine tool that can be utilized for either drilling or self-leading tapping operations.

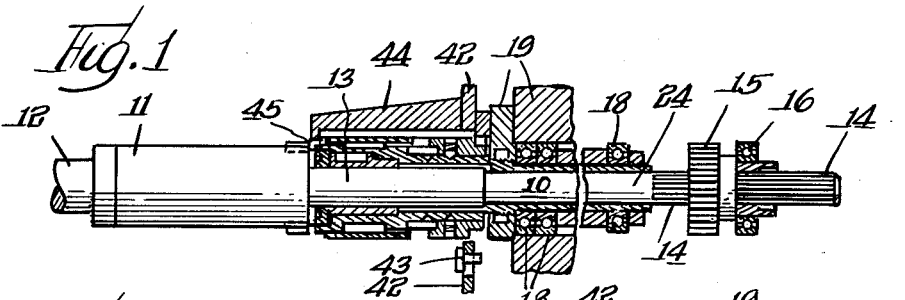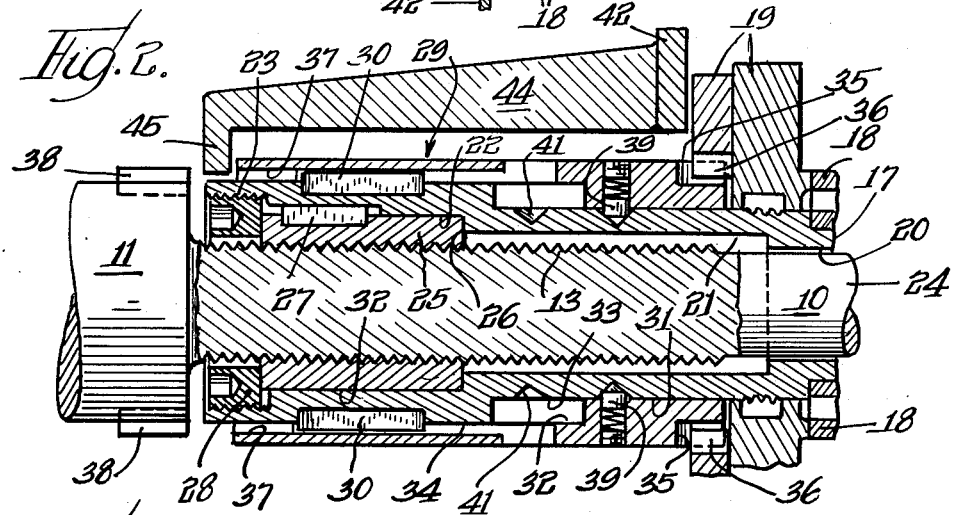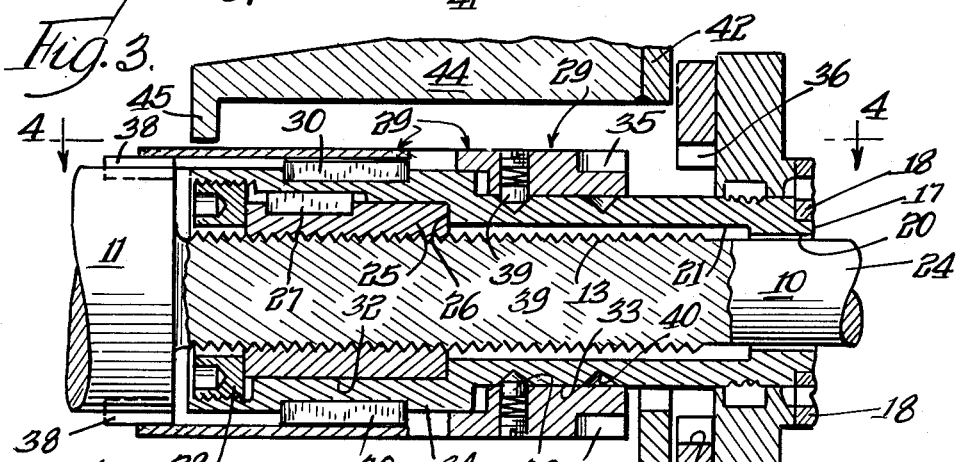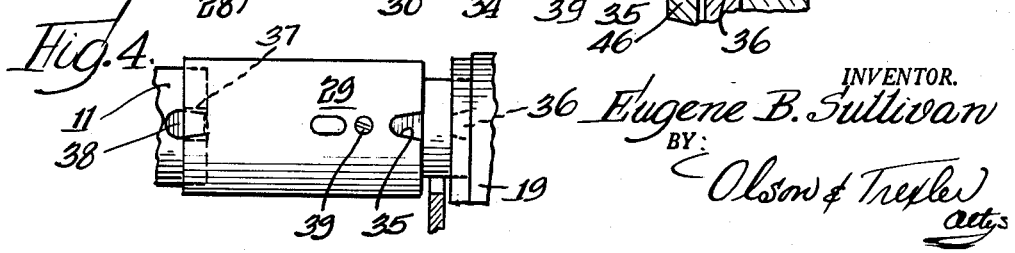
INVENTOR.
Eugene B. Sullivan
BY:
Olson & Trexler
attys 3,058,129
COMBINATION DRILLING AND SELF-LEADING
TAPPING MACHINE TOOL
Eugene B. Sullivan, Rockford, Ill., assignor to W. F. and
John Barnes Company, Rockford, Ill., a corporation
of Illinois
Filed Dec. 27, 1960, Ser. No. 78,550
6 Claims. (Cl. 10—139)

An important feature of the present invention is the ease of conversion from tapping to drilling operations and vice versa without the use of special tools and implements. Specifically, the present invention includes a spindle having a tool supporting portion at one end and having means for rotatable driving at the other end. A hollow shaft surrounds the spindle and is bearingly mounted on a support. The spindle is longitudinally movable within the hollow shaft and is provided with an externally threaded portion engaging a nut member that is fixed within the hollow shaft. A sleeve encircles a part of the hollow shaft and is slidable therealong for the purpose of controlling operation of the spindle. The sleeve is keyed to the hollow shaft so that it co-rotates therewith; and upon shifting of the sleeve to a position locking it to the spindle, the nut member is locked to the spindle for co-rotation therewith so that the spindle may be utilized for a drilling operation. Shifting of the sleeve in the opposite direction locks it to the support thereby holding the nut member so that upon rotation of the spindle, it, the spindle, will be shifted longitudinally within the hollow shaft because of the threads engaging the stationary nut member.

Accordingly, an object of the invention is to provide a machine tool that is capable of being utilized for either tapping or drilling operations.

Another object of the invention is to provide a machine tool that can be easily and quickly converted for use in tapping operations or in drilling operations without the use of special tools.

Still another object of this invention is to provide a machine tool that can be easily converted for use in drilling or tapping operations and that is securely lockable into either the tapping or drilling position.

Other objects, features and advantages of the invention will become apparent from the following detailed disclosure, taken in conjunction with the accompanying drawing, wherein like reference numerals refer to like parts and in which:

FIG. 1 is a side elevational view of a machine tool constructed according to the invention, shown broken and fragmentary in part and showing some parts in section for purposes of illustration;

FIG. 2 is an enlarged, sectional view of the portion of the machine tool of the invention which includes the mechanism for converting the tool between self-leading tapping and drilling operations, some parts being shown in elevation, the figure particularly illustrating the position of the parts when the tool is conditioned for self-leading tapping operations;

FIG. 3 is a view similar to FIG. 2 but illustrating the parts in position where the tool is conditioned for drilling operations; and FIG. 4 is a reduced scale view taken along the line 4—4 of FIG. 3.

The combination drilling and self-leading tapping machine tool of the present invention may be utilized in connection with automatic machine tool apparatus or wherever there is a need to have a machine tool capable of being used for either drilling or self-leading tapping operations, although other uses and purposes of the present invention will be apparent from the following disclosure.

Referring now in detail to the drawing, the machine tool of the present invention will be seen to include a spindle 10 having a tool supporting portion 11 at one end for holding a drill adapter or tap holder 12. A portion of the spindle 10 is externally threaded at 13, and this portion is substantially smaller diametrically than the tool supporting portion 11. The end of spindle 10 which is opposite the tool supporting portion is externally splined at 14. A drive gear 15 is internally splined to mesh with the splined portion 14 of the spindle and to permit directed longitudinal movement of the spindle relative to the gear. A bearing 16 rotatably supports the drive gear 15 in a fixed position. Power may be supplied to the drive gear from any suitable means for rotationally driving the spindle 10.

A hollow shaft 17 concentrically surrounds a portion of the spindle 10. A plurality of bearings 18 rotatably support the hollow shaft 17 and are, in turn, carried by a support 19, specifically the face wall of a tool head. As shown in FIG. 2, the hollow shaft 17 is provided with a plurality of internal, stepped bores 20, 21, 22 and 23, which bores are progressively larger looking from right to left. Between the threaded portion 13 and the splined portion 14, the spindle 10 is provided with a cylindrical section 24, section 24 being normally received within the stepped bore 20. The splined portion 14 is also sized to be receivable within the stepped bore 20, there being sufficient clearance to permit unimpeded slidable movement of the spindle relative to the hollow shaft. The stepped bore 21, being slightly larger than the stepped bore 20, is sized freely to pass the threaded portion 13, portion 13 being slightly larger diametrically than the cylindrical portion 24.

An internally threaded nut member 25 is received within the stepped bore 22 with the inner end in abutting relation to a shoulder 26 which is defined between the stepped bores 21 and 22. A key 27 or other suitable means is provided for locking the nut member 25 to the hollow shaft 17 thereby to prevent relative rotation therebetween. The nut member 25 threadedly engages the threaded portion 13 of the spindle and is held against longitudinal movement relative to the hollow shaft 17 by means of a retaining ring 28 threadedly received in the stepped bore 23 of the hollow shift and engaging with the outer end of the nut member 25.

A sleeve, generally designated by the numeral 29, concentrically surrounds a part of the hollow shaft 17 and serves to control the operation of the spindle. The sleeve 29 is slidable on the hollow shaft but is prevented from rotating relative thereto by a pair of diametrically opposed keys 30 held by the hollow shaft 17 and in engagement with elongated keyways formed in the sleeve 29. The sleeve 29 is provided with a pair of stepped internal bores 31 and 32 slidably mating with external cylindrical portions 33 and 34, respectively, of shaft 17.

At one end of the sleeve 29, the right hand end as seen in the drawing, diametrically opposed tapered slots 35 are formed in the external surface thereof and opening toward the right thereof for receiving tapered and mating lugs 36 when the sleeve is shifted to the far right position as shown in FIG. 2, lugs 36 being fixed to support 19. The slots 35 and the lugs 36 thereby function as lock members to secure sleeve 29 and support 19 together and against relative rotation when the sleeve is shifted to the far right position.

At the left-hand end of the sleeve 29, as viewed in the drawing, tapered slots 37 are formed at diametrically opposed positions internally of the sleeve and in substantial alignment with the elongated keyways for mating engagement with tapered lugs 38 integral with the tool supporting portion 11 of the spindle, as seen in FIG. 3. Hence, the slots 37 and lugs 38 serve selectively to lock the sleeve 29 to the spindle when the sleeve is shifted to the far left as seen in FIG. 3.

A pair of spring-loaded, tapered pins 39 are carried in the sleeve 29 for selective engagement with cooperatively shaped indents 40 and 41 to define the operative positions of the sleeve 29.

Referring now particularly to FIG. 1, an interlock plate 42 is provided for slidable movement normal to the axis of spindle 10. A plurality of slots in plate 42 engage with pins 43, one of which is shown, to define the limits of this movement. An arm 44 is attached to the plate 42 and is provided with a finger 45 for movement into the path of the left-hand end of the sleeve 29, as seen in FIG. 2, to prevent inadvertent shifting of the sleeve during operation in the position shown therein. A finger portion 46 is also provided on the interlock plate 42, as seen in FIG. 3, to be movable into the path of the right-hand end of the sleeve 29 for preventing shifting of the sleeve to the right during operation in that position. As noted in FIG. 3, the finger 45 is shifted out of the path of the left-hand end of the sleeve 29 thereby automatically shifting the finger portion 46 into the path of the right-hand end of the sleeve. Thus, shifting of the sleeve 29 may be accomplished only when the interlock plate 42 is in an intermediate position leaving both ends of the sleeve unobstructed.

In operation, when the sleeve 29 is shifted to the right extreme position as shown in FIG. 2, it is held against rotational movement relative to the support 19 by the mating of slots 35 and lugs 36. In this position, nut member 25 and shaft 17 are likewise held against rotational movement relative to the support 19 by virtue of key 27 and keys 30. Finger 45 engages the cooperating end of sleeve 29 to prevent axial movement of the sleeve. Thus, spindle 10 is caused to shift longitudinally upon rotation thereof under the influence of drive gear 15. This condition serves to use the spindle for driving a tap or other threading tool mounted in the tap holder 12. The pitch of the propelling threads (threads on the spindle and the nut member) corresponds with the pitch of the threading tool, as is customary in lead screw type threading spindles.

When the sleeve 29 is shifted to the extreme left position as shown in FIG. 3, the machine tool is conditioned for drilling. In this position, the sleeve 29 is locked to the spindle 10 by virtue of the mating of slots 37 and lugs 38. The hollow shaft 17 and nut member 25 are likewise locked to the spindle 10 for co-rotation therewith by the action of key 27 and keys 30. Furthermore, finger 46 abuts the right end of sleeve 29 to block the sleeve from sliding relative to the spindle 10. Thus, slots 37 and lugs 38 are maintained in engagement. The drill is directed into the work when support 19, i.e. the tool head, is translated away from gear 15 as by a lead screw, not shown. As will be recognized, support 19 may also be translated in like manner to traverse the spindle into relation with the work prior to starting a tapping operation.

It will be understood that modifications and variations may be effected without departing from the scope of the present invention, and it is understood that this application is to be limited only by the scope of the appended claims.

The invention is hereby claimed as follows:

1. Machine tool apparatus comprising: a tool supporting spindle; a threaded portion on said spindle; a nut engageable with said threaded portion; a hollow shaft embracing said nut and a part of said spindle; means antifrictionally engaging said hollow shaft and rotatable therewith; a selectively translatable member disposed adjacent said means; means axially slidable relative to said hollow shaft and locked thereto to prevent relative rotation therebetween, said axially slidable means being selectively engageable with said translatable member in one position, to permit rotation between said spindle and said nut and being selectively engageable with said spindle in another position to lock said nut relative to said spindle for co-rotation therewith; and means for rotationally driving said spindle.

2. Machine tool apparatus comprising: a hollow shaft; means antifrictionally engaging said hollow shaft; a nut carried within said hollow shaft and co-rotatable therewith; a spindle slidably received within said hollow shaft having a threaded portion in engagement with said nut; a tool supporting portion on one end of the spindle; means engageable with the other end of said spindle for rotationally driving said spindle; a sleeve slidably embracing said hollow shaft, said sleeve being keyed to said hollow shaft for co-rotation therewith and having means engageable with said spindle to lock said nut thereto for co-rotation therewith; and means engageable with a selectively translatable member to permit relative rotation between said nut and said spindle.

3. A combination drilling and self-leading tapping machine tool comprising: a tool supporting spindle having a threaded portion thereon; means for rotationally driving said spindle; a hollow shaft surrounding a part of said spindle; bearings for rotatably mounting said shaft; a support for said bearings; a nut fixed within said hollow shaft and in threaded engagement with the threaded portion of said spindle; a sleeve surrounding a part of said hollow shaft and longitudinally movable therealong; means for keying said sleeve and shaft together; coacting means on one end of said sleeve and on said spindle for selectively locking the sleeve and spindle together when the sleeve is shifted to one position thereby locking the nut and spindle together for co-rotation; and coacting means on the other end of the sleeve and on said support for locking the nut and support together when the sleeve is shifted to the other position thereby permitting longitudinal shifting of the spindle relative to the hollow shaft upon rotation of said spindle.

4. A combination drilling and self-leading tapping machine tool comprising: a tool supporting spindle having a threaded portion thereon; means for rotationally driving said spindle; a hollow shaft surrounding a part of said spindle; bearings for rotatably mounting said shaft; a selectively translatable support for said bearings; a nut fixed within said hollow shaft and in threaded engagement with said threaded portion of said spindle; a sleeve surrounding a part of said hollow shaft and longitudinally movable therealong; means for keying said sleeve and shaft together; coacting means on one end of said sleeve and on said spindle for selectively locking the sleeve and spindle together when the sleeve is shifted to one position thereby locking the nut and spindle together for co-rotation; coacting means on the other end of the sleeve and on said support for locking the nut and support together when the sleeve is shifted to the other position thereby permitting longitudinal shifting of the spindle relative to the hollow shaft upon rotation of said spindle; and means on said support for locking said sleeve in either of said positions.

5. A combination drilling and self-leading tapping machine tool comprising: a tool supporting spindle having a threaded portion thereon; means for rotationably driving said spindle; a hollow shaft surrounding a part of said spindle; bearings for rotatably mounting said shaft; a selectively translatable support for said bearings; a nut fixed within said hollow shaft and in threaded engagement with said threaded portion of said spindle; a sleeve surrounding a part of said hollow shaft and longitudinally movable therealong; means for keying said sleeve and shaft together; coacting means on one end of said sleeve and on said spindle for selectively locking the sleeve and spindle together when the sleeve is shifted to one position thereby locking the nut and spindle together for co-rotation; coacting means on the other end of the sleeve and on said support for locking the nut and support together when the sleeve is shifted to the other position thereby permitting longitudinal shifting of the spindle relative to the hollow shaft upon rotation of said spindle; and a slidable plate on said stationary support for locking said sleeve in either of said positions.

6. A combination drilling and self-leading tapping machine tool comprising: a spindle having a tool supporting device at one end and means at the other end for rotationally driving the same; a hollow shaft concentrically surrounding a part of said spindle; bearings for rotatably mounting said shaft; a selectively translatable support for said bearings; an external screw thread formed along a portion of said spindle; an internally threaded nut member fixed within said hollow shaft and in threaded engagement with the external thread of said spindle; a sleeve surrounding part of said hollow shaft and movable longitudinally thereof; said sleeve being keyed to said hollow shaft to prevent relative rotation therebetween; a first lock member on one end of said sleeve; a mating lock member on said spindle adapted to engage the first lock member when the sleeve is shifted towards one end of the spindle whereby the spindle, hollow shaft and sleeve are united to rotate as a unit; a second lock member on the other end of said sleeve; a mating lock member on said support adapted to engage the second lock member when the sleeve is shifted towards the other end of the spindle whereby the sleeve, the nut and the hollow shaft are held stationary and the spindle, by virtue of the threads thereon in engagement with the nut member, is shifted longitudinally upon rotation thereof.

References Cited in the file of this patent

UNITED STATES PATENTS 2,893,276  Quackenbush _____ July 7, 1959